United States Patent [19]

Engeler et al.

[11] Patent Number: 5,566,133
[45] Date of Patent: Oct. 15, 1996

[54] SYSTEM AND METHOD OF BINARY OPTICAL COMMUNICATION FOR ULTRASONIC PROBE

[75] Inventors: William E. Engeler, Scotia, N.Y.; Matthew O'Donnell, Ann Arbor, Mich.; Sharbet E. Noujaim, Wauwatosa, Wis.

[73] Assignee: General Electric Company, Schenectady, N.Y.

[21] Appl. No.: 564,551

[22] Filed: Nov. 29, 1995

[51] Int. Cl.⁶ .................................................. G03B 42/06
[52] U.S. Cl. .............................................. 367/11; 367/149
[58] Field of Search ........................... 367/149, 140, 367/7, 11; 364/413.75; 128/660.01, 662.03

[56] References Cited

U.S. PATENT DOCUMENTS 5,353,262 10/1994 Yakymyshyn et al. .................. 367/149

OTHER PUBLICATIONS

Giallorenzi et al., "Optical–Fiber Sensors Challenge The Competition", *IEEE Spectrum;* Sep., 1986, pp. 44–49.

*Primary Examiner*—Daniel T. Pihulic
*Attorney, Agent, or Firm*—Marvin Snyder

[57] ABSTRACT

An optical communication system for ultrasound imaging systems employs a light source and photodetector array in the imaging console. The light source and photodetector array are coupled to each other through an optical fiber passing through the probe. Information from the probe is communicated to the console by an optical modulator, situated in the optical path from source to detector. The ultrasound signals are converted into electrical signals by probe electronics, and these electrical signals serve to alter either the phase or amplitude of optical signals passing through the modulator. Since the light source and photodetectors reside in the imaging console, very little power is dissipated in the probe.

9 Claims, 1 Drawing Sheet

SYSTEM AND METHOD OF BINARY OPTICAL COMMUNICATION FOR ULTRASONIC PROBE

BACKGROUND OF THE INVENTION

1. Field of the Invention

This invention relates to optical communications and, more particularly, to a system and method of optical modulation for communication with phased array ultrasonic probes.

2. Description of the Related Art

Ultrasonic imaging systems, as commonly used for medical imaging, require an array of ultrasonic transducers contained within a probe to provide steering and focusing of the ultrasonic beam. Each transducer receives a high frequency signal from the object examined that must then be transmitted back to the host electronic system or imaging console for signal processing. Even with advanced Very Large Scale Integration (VLSI) microelectronic techniques, only a relatively small part of the overall system electronic signal processing may reside at the probe head.

Transmitting the signal requires that the number of cables carrying individual signals back to the host electronics be of the same order as the number of individual transducer elements in the sensing array. Since this number may be greater than 500 in presently envisioned two dimensional arrays, the number of cables required is quite large.

Signals representing the response of individual ultrasonic transducers may be transmitted to the host electronics system from the probe through optical fibers. These fibers are individually small in diameter and may be formed into bundles that are composed of a large number of individual fibers while still maintaining their overall flexibility. While converting the signals to light so that optical fibers may be used improves the flexibility of the bundle, power requirements are increased. Further, combining signals by preprocessing or by multiplexing is limited by the power requirements of these operations and by the power limitations of the probe head. Another obstacle to implementing an optical communications system for ultrasonic probes is the requirement for an optical modulator having both sufficient dynamic range and sufficiently wide bandwidth for directly transmitting ultrasound signals to the host electronics.

SUMMARY OF THE INVENTION

The present invention is directed to a system and method of optical communication for an ultrasonic probe, which substantially overcomes the limitations and disadvantages of the prior art. Therefore, one object of the invention is to provide an optical communication system for an ultrasonic probe which employs an optical modulator having sufficient dynamic range and wide bandwidth for directly transmitting ultrasound signals to host electronics.

Another object of the invention is to provide a method of optically communicating signals from an ultrasonic probe to host electronics without excessive power consumption.

Briefly, in accordance with a preferred embodiment of the invention, an ultrasonic optical communication system comprises an imaging console having a light source and a photodetector array which are optically coupled through an ultrasonic probe. The ultrasonic probe includes a plurality of transducer elements for receiving ultrasound signals, and a binary optical modulator coupled between the light source and the photodetector array. The ultrasound signals are convened into electrical signals in probe electronics, and these electrical signals serve to alter optical signals passing through the modulator.

In another aspect of the invention, a method of providing ultrasonic optical communication comprises the steps of: illuminating a plurality of optical fibers optically coupled through a probe to a photodetector array; receiving ultrasound signals at the probe; convening the ultrasound signals into electrical signals; producing an optical signal with either the phase or amplitude altered in accordance with the electrical signals; and detecting the altered optical signal.

In the optical communication system of the invention, both the light source and photodetector array reside in the imaging console. The light source and photodetector array are each coupled to the probe through a respective optical fiber link. Information from the probe is communicated to the console by an optical modulator situated in the optical path from light source to photodetector array. The optical modulator converts ultrasound signals into electrical signals which it uses to alter either the phase or amplitude of optical signals passing through the modulator. Since the light source and photodetectors reside in the imaging console, very little power is dissipated in the probe.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DESCRIPTION OF A PREFERRED EMBODIMENT

Figure 1:
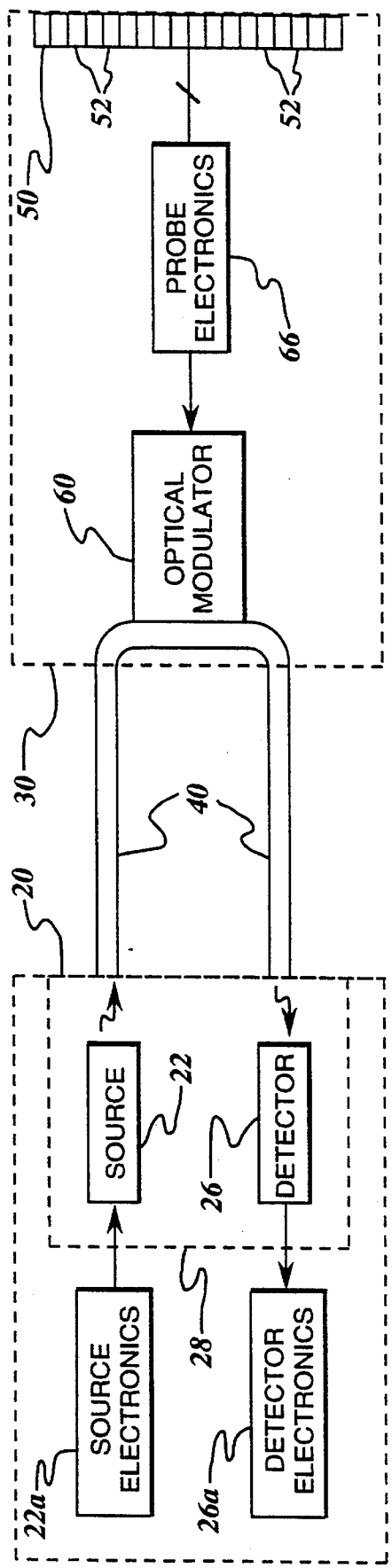
FIG. 1 is a schematic representation of an optical communication system with ultrasonic probes in accordance with the present invention.

FIG. 1 shows the basic arrangement of an optical detection system having a light source 22 and light detector 26 within an optical transceiver 28. Light source 22, which is controlled by source electronics 22a, and light detector 26, which drives detector electronics 26a, are optically coupled to an ultrasonic probe 30 through an optical modulator 60, and are contained in imaging apparatus such as an imaging console 20. Light detector 26 preferably comprises an array of photodetectors. Light source 22 may comprise, for example, a continuous wave (CW) laser that emits electromagnetic energy in the visible or near infrared region of the spectrum and has sufficient power so as not to be limited by photon noise. Locating light source 22 in the imaging console is advantageous in that the power required to generate the light is dissipated in that unit rather than in probe 30 where capability for cooling is limited.

Light source 22 and detector 26 are coupled in an optical path through probe 30 by a bundle of optical fibers 40. Probe 30 houses an ultrasonic transducer array 50 containing multiple transducer elements 52. Linear arrays comprising 128 to 256 transducer elements are typical; however, two dimensional arrays of 512 to 1024 transducer elements are contemplated by the invention.

When optical fibers 40 are illuminated by light source 22, each fiber carries a separate portion of the light to a respective one of transducer elements 52 in the probe. The light representing the signal from each transducer element must then be transmitted back to imaging console 20 through the bundle of optical fibers. This bundle provides isolation of the individual signals without sacrificing mechanical flexibility and relatively small cross-sectional size.

Ultrasonic information from transducer elements 52 is communicated to console 20 via an optical modulator 60, which is situated in the optical path from light source 22 to light detector 26. Optical modulator 60 receives the ultrasound signals in the form of electrical signals which are provided to modulator 60 by probe electronic circuitry 66. The electrical signals are used by modulator 60 to alter either the phase or amplitude value of an optical signal passing through the modulator which thus comprises either a phase modulator or amplitude modulator, respectively. Since the light sources and detectors reside in imaging console 20, very little power is dissipated in the probe.

Figure 2:
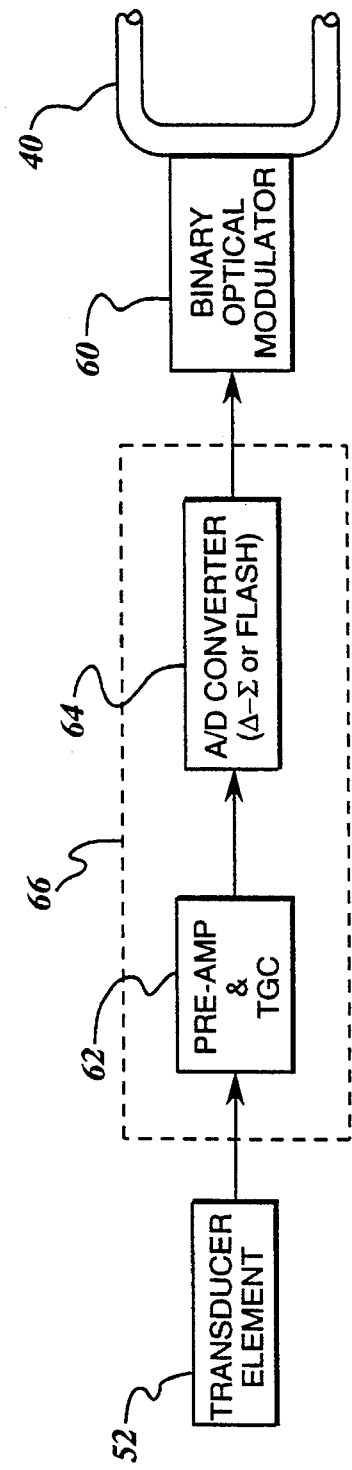
FIG. 2 is a block diagram representation of a digital optical modulator in accordance with the present invention.

FIG. 2 is a block diagram of an optical modulator capable of transmitting ultrasound signals to the imaging console 20 with sufficient dynamic range and bandwidth, together with electronic modulating circuitry therefor. A digital approach is used in order to circumvent some of the problems currently limiting use of analog optical modulation, such as the limitation on the dynamic range of the transmitted signal due to the discrete nature of the light photons. Attempts at achieving large dynamic range typically give rise to production of noise, generally referred to as photon noise, which limits the dynamic range of the photon signals. Digital signals, on the other hand, require only the detection of a "zero" or "one" signal, although at a higher repetition rate.

For the system depicted in FIG. 2, the output signal from each transducer element 52 may be amplified in probe electronics 66, respectively, using pre-amplifier and time-gain-control (TGC) circuits 62 in the probe electronics. Use of these circuits reduces the dynamic range requirements of the ultrasound signal so that an analog-to-digital (A/D) converter operating at 20 MHz with 8–10 bit resolution is sufficient to preserve all information.

In the embodiment shown, the analog signal is sampled using a delta-sigma analog to digital (A/D) converter 64 operating in probe electronics 66, respectively, at a sampling rate of 200–1000 MHz. This A/D converter produces a single bit output signal-enabling the transmitted data to be binary—at a clock rate of 200–1000 MHz (i.e., a 200–1000 Mbit/sec rate) using a single or multiple stage feedback loop.

Other types of A/D converter may be used, such as flash (or parallel) A/D converters; however, use of flash A/D converters generally requires a larger number of individual fibers for transmission of their parallel output signals than for transmission of delta-sigma A/D converter output signals.

The high speed digital signal next enters a binary digital optical modulator 60. Digital modulators based on free-carrier dispersion in silicon can be constructed with modulation rates in excess of 200 Mbit/sec. These modulators can be constructed using the same silicon processing methods currently available for producing high speed analog and digital circuits. Consequently, the entire electronic chain shown in FIG. 2, comprising the pre-amplifier and TGC, A/D converter, and binary optical modulator, can be highly integrated, resulting in low power consumption and small size.

In a binary system of the delta-sigma A/D converter type, accuracy is achieved by oversampling. Typically one bit data is sent by the modulator at a rate that is many times that required by the bandwidth of the signal. As discussed previously, sampling rates of 200–1000 MHz are contemplated, while ultrasound bandwidths are typically on the order of only a few MHz.

Linear analysis predicts that the effective bit width due to digital noise remaining in the passband after filtering is given by, $$b=(Mo+0.5)\text{Log}_2 R$$

where R is the oversampling ratio and Mo is the modulator order. A second order modulator therefore requires an oversampling ratio of 32 to achieve 10 bit resolution. Modulation at 200–1000 MHz rates thus allows digital processing of the received signal to recover data at 8–10 bit resolution even though single bit wide pulses are transmitted.

The final modulated optical signal is detected at console 20, illustrated in FIG. 1, where it is reconverted into an electrical bit stream at a clock rate of 200–1000 MHz. As in all systems using delta-sigma conversion, the bit stream must be appropriately filtered and decimated to produce a multibit digital word at the appropriate clock rate (here, 20 MHz) for digital processing of ultrasound signals.

The resulting signals are passed to the remaining signal processing electronics of the system. If amplitude modulation is utilized, then only amplitude detection is necessary at the host electronics. If phase detection is utilized, then a reference light beam may be used in conjunction with the retuning phase-shifted signals to produce the desired signals.

Control signals necessary to time the pulsing of each transducer element 52 may also be sent to the probe head through the optical fibers. In such case the light is gated at the imaging console and detected at the probe head. These detected signals are in turn used to trigger the onset of pulsing of the transducer elements to provide the desired ultrasonic beam.

It may also be desirable to limit the number of optical fibers in the system by utilizing the same fibers to both send the control signals and to send the light to the transducers. This is readily accomplished by gating the light on at the start of its transmission in accordance with the desired timing of the start of the ultrasonic pulse and leaving it on during reception of the return signals. A portion of this light is used to trigger the ultrasonic pulse and the remainder is used as the light source for the transducers.

The optical system may also be utilized to provide other necessary control functions. For example, some additional time gain compensation control (TGC) may be achieved by modulating laser light source 22. The resulting signal modulation at detector 26 will then be the product of the light modulation at the source and the modulation at the transducer, while the light intensity of the laser acts as a gain control for the system.

Additional signal processing may also be done in the optical domain without the necessity of immediately returning to the electronic domain. An example would be the demodulation of the signals to baseband prior to their analog-to-digital conversion and delay compensation.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described my invention, what we claim as new and desire to secure by Letters Patent is as follows:

1. A system for ultrasonic optical communication, comprising:

an ultrasonic probe including a plurality of transducer elements for receiving ultrasound signals;

imaging apparatus including a light source and a photodetector, said light source and said photodetector being coupled in an optical path through said ultrasonic probe; and a binary optical modulator coupled to said optical path between said light source and said photodetector for converting the ultrasound signals into electrical signals to modulate optical signals passing through the modulator.

2. The apparatus recited in claim 1, wherein the optical modulator comprises a phase modulator.

3. The apparatus recited in claim 1, wherein the optical modulator comprises an amplitude modulator.

4. The apparatus recited in claim 1, including an analog-to-digital converter coupling, respectively, each of said transducer elements to said optical modulator.

5. The apparatus recited in claim 4, wherein the analog-to-digital converter comprises a delta-sigma analog-to-digital converter.

6. The apparatus recited in claim 4, wherein the analog-to-digital converter comprises a flash analog-to-digital converter.

7. A method of providing ultrasonic optical communication, comprising:

illuminating a plurality of optical fibers optically coupled through a probe to a photodetector array;

receiving ultrasound signals at the probe;

convening said ultrasound signals into electrical signals;

producing an optical signal having a characteristic thereof altered in accordance with said electrical signals; and detecting said optical signal after alteration of said characteristic.

8. The method recited in claim 7, wherein the altered characteristic of the optical signal comprises a phase value.

9. The method recited in claim 7, wherein the altered characteristic of the optical signal comprises an amplitude value.

* * * * *